Patented Feb. 7, 1950

2,496,297

UNITED STATES PATENT OFFICE 2,496,297

PROCESS OF CULTURING BACTERIA

Lewis Byford Lockwood and Frank H. Stodola, Peoria, Ill., assignors to the United States of America as represented by the Secretary of Agriculture No Drawing. Application April 11, 1947, Serial No. 740,982

4 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of bionic acids, particularly maltobionic acid and lactobionic acid, by bacterial action, and has among its objects the production of these acids and their salts, particularly their calcium salts, in a simple manner and in high yield and purity.

In calcium therapy the use of several organic acid salts of calcium has been practiced for some time. The great solubility of the calcium salts of the bionic acids makes them especially suitable for intravenous treatments. Furthermore, the double calcium salt of the bionic acids and calcium bromide are therapeutically useful.

Many bacteria are known to metabolize disaccharides, and many are known to oxidize them, but in each case none were heretofore known to produce their oxidation products without first splitting the disaccharides by hydrolysis.

We have discovered that bacteria of the genus Pseudomonas of the family Pseudomonadaceae convert the reducing disaccharides directly into the corresponding bionic acids without first splitting them by hydrolysis. Such bacteria produce remarkably high yields, based on the amount of disaccharide used, and the acids are simply and easily recovered, usually in the form of their salts, from the medium. The salts are readily precipitated from the aqueous solutions by addition of alcohol. Recovery by lyophilization methods is also suitable and satisfactory.

The process may be carried out in any of the conventional type vat fermenters widely used in industry. Although bacterial action will take place with considerable production of the bionic acid in shallow cultures without induced aeration or agitation, action proceeds more rapidly in the vat or drum type of fermenter equipped with means of aeration or agitation, preferably both; since contact with oxygen is necessary for the conversion.

We prefer to use temperatures of about 25° to 35° C. for the process. However, for routine operation no special means of temperature control is necessary. The process may be carried out satisfactorily at any temperature within the ordinary range of biological activity.

The concentration of the reducing disaccharides may vary over a wide range. The bacterial action takes place with solutions of a trace up to about 30 percent of the reducing disaccharide. We have found that a 10 percent solution of the disaccharide gives excellent results.

Any of the usual or ordinary nutrients may be used, although a nutrient is not necessary for satisfactory conversion. Crude organic nutrients, as well as purely synthetic nutrients, may be used, as well as mixtures thereof.

Of the reducing disaccharides maltose and lactose give especially good results, and from the standpoint of cost of raw materials, are the more commercially important reducing disaccharides at the present time.

The following specific examples will serve to illustrate our invention, the details are not to be considered as limitative.

Example 1

A 3-liter culture solution containing 278 grams of anhydrous lactose was inoculated with 100 ml. culture of *Pseudomonas graveolens* 14 containing 10 grams of anhydrous lactose.

After inoculation the nutrient solution contained:

| | | |
|---|---|---|
| Anh. lactose | grams | 288 |
| $KH_2PO_4$ | do | 1.86 |
| $MgSO_4.7H_2O$ | do | 0.775 |
| Urea | do | 6.2 |
| Corn steep liquor | ml | 15 |
| Soya oil (antifoam agent) | ml | 1 |
| $CaCO_3$ | grams | 83 |

This solution was placed in the fermenter at 30 pounds' pressure, and during the bacterial action the temperature was maintained at 25° C., and 1200 ml. air per minute was passed in. After 165 hours the solution contained 222 grams of lactobionic acid as the calcium salt. This represents a weight yield of 77 percent.

Example 2

A 3-liter culture solution containing 266 grams of maltose (anhydrous) was inoculated with 100 ml. culture of *Pseudomonas graveolens* 14 which contained 10 grams of maltose (anhydrous). After inoculation the nutrient solution contained:

| | | |
|---|---|---|
| Anh. maltose | grams | 276 |
| $KH_2PO_4$ | do | 1.86 |
| $MgSO_4.7H_2O$ | do | 0.775 |
| Urea | do | 6.2 |
| Corn steep liquor | ml | 15 |
| Soya oil | ml | 1 |
| $CaCO_3$ | grams | 83 |

After 50 hours at 25° with 1200 ml. air per minute and under 30 pounds' pressure the solution contained 213 grams of maltobionic acid, equivalent to a yield of 80 percent.

*Example 3*

A 3-liter culture solution of the same composition as Example 2 except that the maltose content after inoculation was 285 grams, was subjected to the action of *Pseudomonas fragi* 25 at 25° C. The aeration rate was 1200 ml. air per minute. At the end of 94 hours the solution contained 189 grams of maltobionic acid, equivalent to a yield of 66.3 percent.

It will be seen from the above examples that the reducing disaccharide is converted to the corresponding bionic acid simply and in high yield by the bacterial action of *Pseudomonas graveolens* and *P. fragi*. The organisms of this family which have been further effective in a similar manner, producing lactobionic acid from aqueous solutions containing lactose are:

*Pseudomonas putida*
*P. graveolens*
*P. mucidolens*
*P. myoxogenes*
*P. aeruginosa*
*P. pavonacea*
*P. putrifaciens*
*P. fluorescens*
*P. chlororaphis*
*P. syncyanea*

The organisms which have been found to convert maltose into maltobionic acid are:

*Pseudomonas ovalis*
*P. schuylkilliensis*
*P. graveolens*
*P. fragi*
*P. iodinum*

Having described our invention we claim:

1. A process comprising culturing bacteria of the genus Pseudomonas of the family Pseudomonadaceae in a medium containing a reducing disaccharide to convert the disaccharide directly into the corresponding bionic acid without first splitting it by hydrolysis.

2. The process of claim 1 wherein the disaccharide is lactose.

3. The process of claim 1 wherein the disaccharide is maltose.

4. The process of claim 1 wherein the bacteria is *Pseudomonas graveolens*.

LEWIS BYFORD LOCKWOOD.
FRANK H. STODOLA.

REFERENCES CITED

The following references are of record in the file of this patent:

UNITED STATES PATENTS

| Number | Name | Date |
|---|---|---|
| 2,277,716 | Lockwood et al. | Mar. 31, 1942 |